Figure 1:
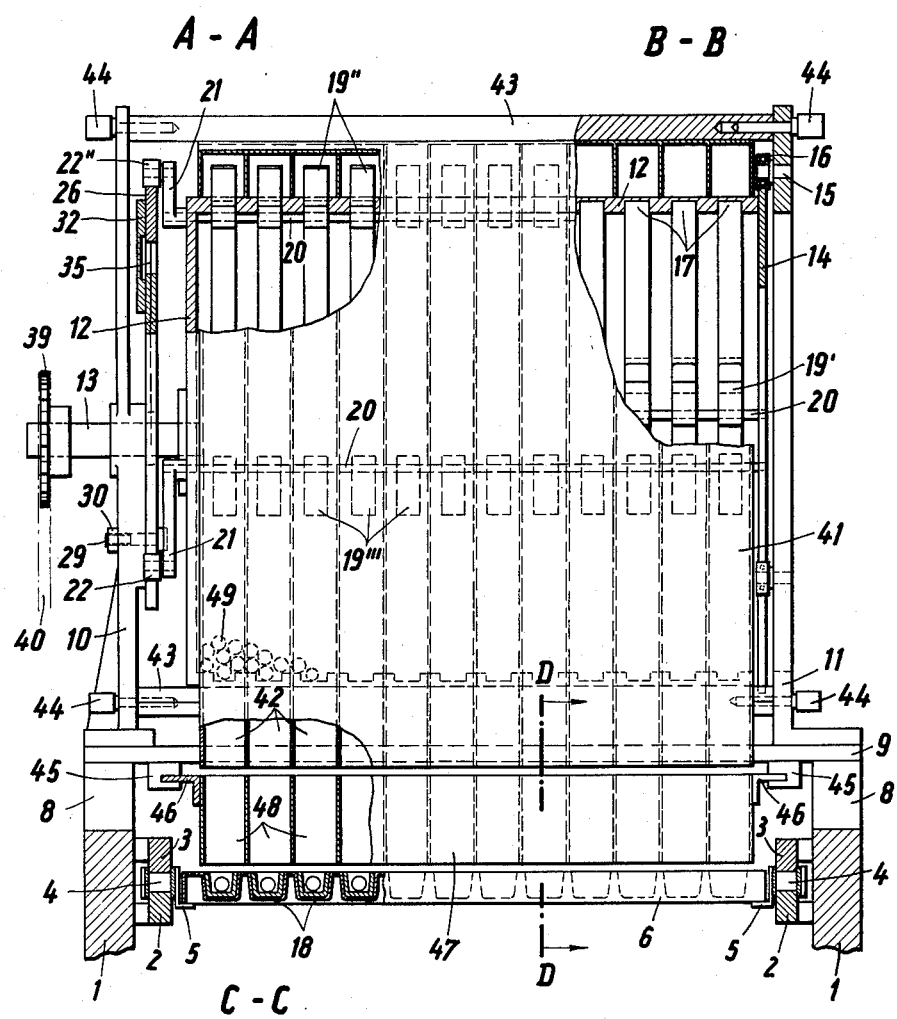

June 2, 1964     R. WINKLER ETAL     3,135,225
CANDY FILLING MACHINE
Filed Feb. 18, 1963     2 Sheets-Sheet 1

Inventors
RICHARD WINKLER
KURT DÜNNEBIER
By Hane and Nydick
ATTORNEYS

Inventors
RICHARD WINKLER
KURT DUNNEBIER

3,135,225
CANDY FILLING MACHINE
Richard Winkler, Burgermeister-Wink-Strasse, Rengsdorf, near Neuwied, Rhineland, and Kurt Dünnebier, Renzentalweg 6, Wollendorf, near Neuwied, Rhineland, Germany
Filed Feb. 18, 1963, Ser. No. 259,287
9 Claims. (Cl. 107—1)

The present invention relates to a machine for inserting fillers in candy shells and, more particularly, to a machine for inserting a filler in a chocolate shell as an operational step in the manufacture of filled or chocolate coated candy. The term "filler" as herein used is intended to encompass any candy filler material having a self-maintaining configuration, such as fruits, for instance nuts, pineapple, cherries steeped or not steeped in a liqueur, etc. as distinguished from a filler in the form of a more or less flowable paste.

Various attempts have been made to design a candy filling machine of the kind above referred to, but all attempts have been unsuccessful heretofore. One of the problems is that fillers such as fruit are usually rather soft and fragile so that they are easily squashed or otherwise damaged, which is commercially not acceptacle. The insertion of the fillers in the shells is still generally done by hand and at considerable labor costs; for instance a single machine for making chocolate coated cherries may require fifteen girls for inserting the cherries in the shells.

It is a broad object of the invention to provide a novel and improved machine of the general kind above referred to with which candy shells can be reliably and rapidly filled in continuous operation and without damaging the fillers.

A more specific object of the invention is to provide a novel and improved candy filling machine in which preformed shells are guided past the machine and as the shells pass the machine they are successively filled.

Another more specific object of the invention is to provide a candy filling machine in which the feeding of fillers by the machine is automatically stopped when no shells are present to receive the fillers.

The aforementioned objects, features and advantages of the invention and other objects, features and advantages which will be pointed out hereinafter are attained by guiding trays containing the shells to be filled along a generally rectilinear path and providing above said path a rotary drum in which are mounted pickers for picking up individual fillers to be inserted one by one in the shells. It is generally practical and advantageous to provide several parallel rows of trays and a corresponding number of pickers in row arrangement in the drum. The pickers are so controlled that they will deposit the picked-up fillers successively into receiving and feed conduits from which the fillers will drop into the shells moving below the discharge end of the feed conduits.

The inner peripheral wall of the drum which is rotatable about an axis transverse of the direction of travel of the trays, is provided with a plurality of circumferential recesses, the width of which is preferably somewhat wider than the width of the fillers. The pickers are arranged in circumferentially spaced sets. Each picker of each set reaches into an opening in the cylindrical drum wall and the pickers in each set are pivotal about a common shaft to which is also secured a control arm, preferably terminating in a guide roller. The angular position of each control arm and with it a movement of the pickers in the respective set between a pick up position and a release position in which a picked up filler is deposited in the receiving conduit is controlled by a control means preferably constituted by several coacting camming members. The camming surfaces of these members guide the rollers on the control arms so that each picker in each successive set is caused first to pick up a filler from a supply in the drum and then to deposit the picked-up filler in the receiving conduit for discharge at the outlet end of the conduit. One of the camming members serves as a deflector to deflect the pickers so that they will not pick up a filler when no shells are ready to receive fillers to prevent the discharge of fillers for which there is no use at the moment. To attain such deflecting action, the respective camming member is pivotally mounted and directs in one position of the deflector the pickers so that they will bypass the camming surface which causes pick up of fillers and in another position will direct the pickers, or, more specifically, the control arms thereof, along said camming surface. The feed conduits into which the fillers fall after having passed through the receiving conduits are movable and so controlled that they move in the same direction and at the same rate of speed as the trays until the shells in the last row on the trays are filled and then return into the initial position to be ready for the first row in the next following tray. To assure a safe transfer of the fillers from the receiving conduits into the feed conduits, the latter have preferably an inlet opening which is wider than the discharge opening of the receiving conduits. The feed conduits may have for instance a funnel-shaped configuration.

In the accompanying drawings a preferred embodiment of the invention is shown by way of illustration and not by way of limitation.

Figure 2:
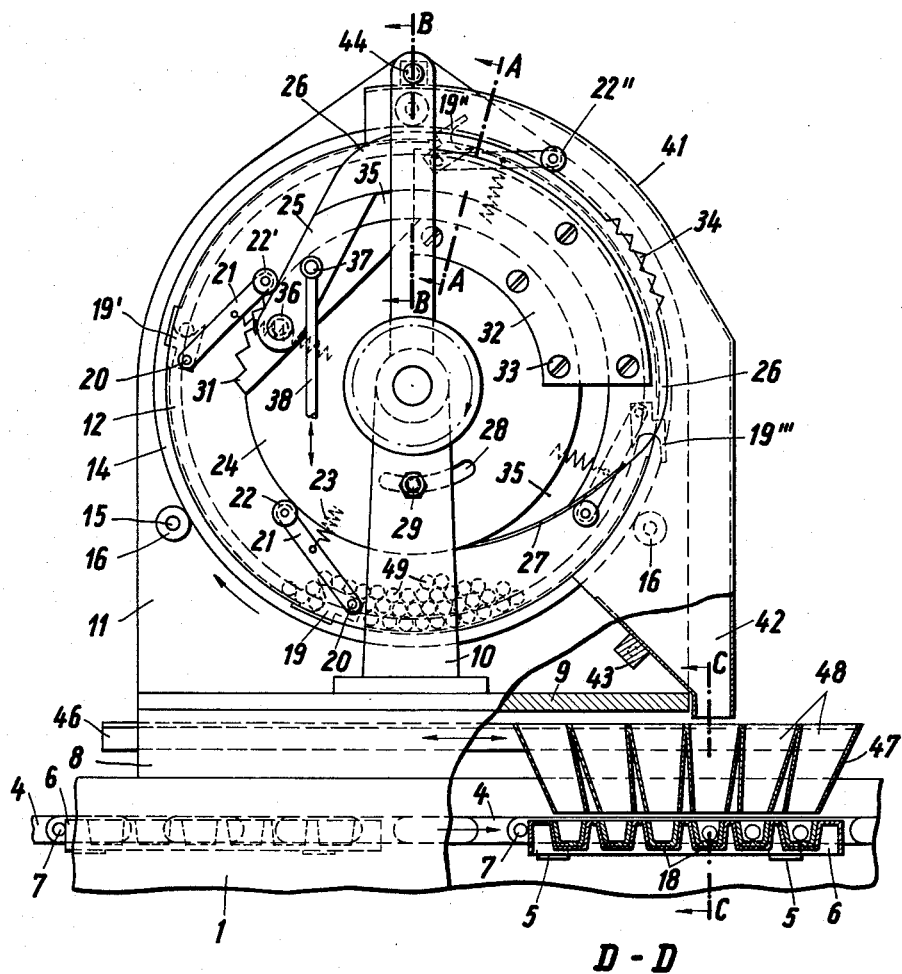

In the drawings:

FIG. 1 is a sectional, elevational view of a candy filling machine according to the invention, the portions A—A, B—B and C—C being fragmentary sections taken on section lines A—A, B—B and C—C of FIG. 2 and the trays for the shells being shown so as to travel normal to the plane of the drawing, and FIG. 2 is an elevational view, partly in section, seen upon the right side of FIG. 1 along section line D—D.

Referring now to the figures in detail, the exemplified candy filling machine comprises a frame including side walls 1. The inside of the side walls mounts guide tracks 2 and 3 between which are guided conveyor chains 4 which are driven at a uniform rate of speed in the direction indicated in FIG. 2 by an arrow. The chains support trays 6 which are held on the chains by angle members 5 and are carried along by pins 7 on the chains. Each tray is formed with indentations in which are inserted candy shells 18 made of chocolate, or other suitable material. As is clearly shown in FIG. 2, each tray, as exemplified, carries six shells and the trays are spaced from each other on the conveyor chain for a purpose which will become fully apparent from the subsequent description. A number of parallel chains and trays thereon are provided in the machine as is clearly shown in FIG. 1. Side walls 1 further mount support members 8 for a base plate 9 which, in turn, mounts stationary bearing plates 10 and 11 for a drum 12. The drum is closed on one of its sides and a short trunnion 13 protrudes from that side. The other and open side of the drum accommodates a ring 14 which is guided on its outer periphery by three guide rollers 16 rotatable on pins 15 to constitute the second bearing support for the drum. The open middle part of ring 14 serves to fill cherries or other fillers 49 into the drum, as is shown in FIG. 2.

The inner cylindrical wall of the drum is formed with a plurality of circumferential grooves or recesses 17 so located that each groove may be in alignment with one of the indentations in a tray 6. In other words, the distance between the mid-points of two adjacent recesses 17 equals the distance between two adjacent shells 18 placed in the indentations of a tray 6. The recesses 17 coact with pickers 19, 19', 19" and 19'" which are disposed in rows extending lengthwise to the rotational axis of the drum and grouped in circumferentially spaced sets. There are shown four sets of pickers spaced from each other by angles of 90 degrees. The number of rows in each set correspond to the number of conveyor chains as seen in FIG. 1. The pickers are extended into corresponding openings in the cylindrical wall of the drum and the pickers in each set are pivotal about a common shaft 20 supported in bearing plates 11 and 12. Each shaft also seats a control arm 21 terminating at its free end in guide rollers 22, 22', 22" and 22'" respectively. A loaded spring 23 is connected to each of the control arms 21 to bias the pickers into a position such that the pickers close the openings provided in the drum wall for the pickers as is shown in FIG. 2 for pickers 19 and 19'.

The angular position of control arms 21 and hence of the pickers is controlled by control means constituted of camming members 24, 25, 26 and 27. These camming members are centered in reference to each other and camming member 24 is secured on bearing plate 10 by means of a circumferentially elongated slot 28 through which extends a screw bolt 29 secured by a nut 20. Slot 28 permits an angular adjustment of the entire control means to effect correct timing of the discharge of the cherries or other fillers.

Camming member 24 is circular except for generally tooth-shaped protrusions 31. The camming member 26 which also is formed with tooth shaped protrusions 34, is secured to camming member 24 by means of a cover plate 32 and screws 33 and defines a circularly curved channel 35 between camming members 24 and 26. Camming member 25 is pivotal about a pin 36 secured in camming member 24 and mounts a pin 37 to which is linked a rod 38. This rod can be displaced up and down as is indicated by a double arrow. The camming member acts as a deflector and when rod 38 is pulled downwardly the camming member is pivoted into a position in which channel 35 is uncovered so that the guide rollers on control arms 21 can enter the channel thereby bypassing camming member 26. Camming member 27 is in the form of a leaf spring to provide on one hand an exit for rollers moving along channel 35 and on the other hand to guide the rollers when channel 35 is closed and the rollers move along the camming surface of camming member 26.

Trunnion shaft 13 of drum 12 seats a chain wheel 39 guiding a chain 40 by means of which the drum is rotated in the direction of the arrow in FIG. 2 and at a rate of rotation correlated with the rate of speed of conveyor chain 4 and the trays thereon.

On the downwardly moving side of the periphery of the drum, that is on the right hand side, as shown in FIG. 2, a receiving assembly 41 is provided. This system is composed of individual receiving conduits 42 which are detachably mounted. The entire system is secured by means of cross-bars 43 and bolts 44 to stationary bearing plates 10 and 11. The receiving system 41 coacts with a feed system 47 mounted on angles 46 which, in turn, are slidably guided by guide tracks 45 secured to the bottom side of base plate 9. The receiver system comprises as many units 48 in the form of funnels as there are indentations for shells 18 in trays 6. The receiver system together with angles 46 is reciprocated by any suitable drive and control means such as a linkage and a camming means so that the entire system moves in the directions indicated by the double arrow in FIG. 2. The directional control of the feed system may for instance be such that the system follows the travel of the trays from left to right in FIG. 2 for ⅝ of the distance between the two pins 7 and then returns into its initial position during the period of time required by the trays to travel through the remaining ⅜ of the distance. As was pointed out before, the trays are spaced on the chain so that the aforedescribed forward and return movement of the receiver system permits the receiver system to be ready for filling the first row of the next following tray after the last row on the preceding tray has left the receiver system.

The machine as hereinbefore described, operates as follows:

The drum 12 is rotated by chain 40 so that the drum makes two complete revolutions in the time the chain 4 requires to travel through a distance corresponding to the spacing between two pins 7. During two such complete revolutions of the drum, the position 19 is reached six times by the pickers. In this position, the respective picker picks up one or possibly several of the cherries 49 rolling around at the bottom of the drum. Just before reaching the position 19', each picker is shaken by engagement of its guide roller 22' with protrusions 31 so that any additional cherry which may have been picked up by the picker is shaken off. As the rollers pass along camming member 25, which is presumed to be in the position shown in FIG. 2, and reach the camming surface of camming member 26, the guide rollers and with it the pickers are so controlled that the latter will be opened one by one. When the pickers reach approximately the position 19" or slightly later, the protrusions 34 now coacting with roller 22" will cause the cherries to fall out of the pickers and the cherries will fall one by one into the corresponding receiving conduits 42 and through these conduits into funnels 48 constituting part of the feed or receiver system 47. The funnels will discharge the cherries into the row of candy shells 18 then below the discharge end of the funnels. As it is evident, all six rows of shells shown in FIG. 2 will be successively filled. After the last row in a tray 6 is filled, a mechanism preferably controlled by tray 6 and acting upon rod 38 causes the pivotal camming member 25 to be pivoted into a position in which the next guide roller 22' can enter channel 35. As a result the respective row of pickers remains closed so that no cherries will fall into the space between the just filled tray and the next following tray. At the same time the feed or receiver system is returning into its initial position as previously described in which it is again located above the next tray to be filled. The camming member 25 is now returned into its full line position and the aforedescribed cycle is repeated.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore to cover all such changes and modifications in the appended claims.

We claim:

1. A machine for inserting fillers in candy shells, said machine comprising several parallel rows of trays, each for receiving thereon shells to be filled, guide and drive means for moving successive shell carrying trays along a predetermined path, a drum for receiving therein a supply of fillers, said drum being rotatable about an axis transverse of said path, several sets of pickers mounted in said drum in circumferentially spaced relationship, each set including a row of pickers disposed parallel to the rotional axis of the drum, guide and feed means including stationarily mounted receiving conduits and movable feed conduits coacting with said receiving conduits and moving over and along the path of said trays, and control means controlling successive sets of pickers to pick up individual fillers and to release the picked-up fillers into the receiving conduits whereby the released fillers are deposited through the feed conduits in candy shells on successive trays.

2. A machine according to claim 1 wherein the inner peripheral wall of the drum includes circumferential recesses one for each row of trays, said pickers being supported by said drum for rotation in unison with the drum and coaction with said recesses.

3. A machine according to claim 2 wherein said control means comprise a common pivot shaft for the pickers of each set, said shafts being supported by the drum, and a control arm secured to said shaft, the angular position of said arms controlling the pick up and release position of a respective picker.

4. A machine according to claim 3 wherein said control means further comprise camming means composed of several camming members engageable with said control arms when the pickers rotate with the drum, the camming surfaces of said camming members being shaped to guide the rows of pickers, set by set, first into a pick-up position and then into a release position in a predetermined sequential and time relationship.

5. A machine according to claim 4 wherein one of said camming members is mounted movable between two limit positions, said movable camming member in one of said positions controlling said control arms so as to deflect the respective picker from reaching the pick-up position and in the other position permitting the picker to reach said position, the camming member being settable into either of said positions in accordance with the presence and absence of trays to be filled to prevent the release of fillers in the event no shell is located to receive the same.

6. A machine according to claim 5 wherein said deflecting cam member is mounted between two other camming members pivotal in reference thereto, and a control member is linked to said pivotal camming member to pivot the same into one of said limit positions.

7. A machine according to claim 1 wherein said feed conduit comprises an array of discharge ducts disposed in a row parallel to said path of the trays, and drive means to move said array first through a predetermined distance in the direction of the movement of said trays and then through the same distance in the opposite direction to return the array into its starting position, said movements of the array being so timed that during said first movement all the shells on the tray underneath the discharge ducts are filled with fillers and that the return movement of the array is completed when the next tray arrives in the position underneath the discharge ducts.

8. A machine according to claim 7 wherein said shell carrying trays are disposed spaced apart on said guide and drive means, and wherein said drive means for the array of discharge ducts control the movements of said array so that the return movement of the array is completed within the time required by the guide and drive means to travel through a distance corresponding to the spacing between adjacent trays.

9. A machine according to claim 8 wherein said discharge ducts are funnel shaped, the mouth of the funnels being wider than the outlet ends of the receiving conduits.

References Cited in the file of this patent
UNITED STATES PATENTS

| | | |
|---|---|---|
| 1,756,222 | Swett | Apr. 29, 1930 |
| 2,721,999 | Luteran | Apr. 17, 1956 |
| 2,792,966 | Paul | May 21, 1957 |